US012811895B2

(12) United States Patent
Galles et al.

(10) Patent No.: US 12,811,895 B2
(45) Date of Patent: Nov. 24, 2026

(54) METHODS AND SYSTEMS FOR SPECIFYING AND GENERATING KEYS FOR SEARCHING KEY VALUE TABLES

(71) Applicant: Pensando Systems, Inc., Milpitas, CA (US)

(72) Inventors: Michael Brian Galles, Los Altos, CA (US); Neil Barrett, Palo Alto, CA (US)

(73) Assignee: Pensando Systems Inc., Milpitas, CA (US)

( * ) Notice: Subject to any disclaimer, the term of this patent is extended or adjusted under 35 U.S.C. 154(b) by 1115 days.

(21) Appl. No.: 17/903,902

(22) Filed: Sep. 6, 2022

(65) Prior Publication Data

US 2024/0080279 A1 Mar. 7, 2024

(51) Int. Cl.

*H04L 49/00* (2022.01)
*H04L 45/745* (2022.01)
*H04L 69/22* (2022.01)

(52) U.S. Cl.

CPC ........ *H04L 49/3063* (2013.01); *H04L 45/745* (2013.01); *H04L 69/22* (2013.01)

(58) Field of Classification Search

None

See application file for complete search history.

(56) References Cited

U.S. PATENT DOCUMENTS

| | | | | |
|---|---|---|---|---|
| 8,743,877 | B2 | 6/2014 | Pope et al. | |
| 9,954,779 | B2 | 4/2018 | Pitchai et al. | |
| 2016/0285753 | A1* | 9/2016 | Guleria | H04L 45/38 |
| 2021/0185153 | A1* | 6/2021 | Kittner | H04L 69/26 |
| 2022/0326976 | A1* | 10/2022 | Dey | G06F 11/301 |

OTHER PUBLICATIONS

P4, "P416 Language Specification", version 1.2.2, The P4 Language Consortium, May 17, 2021, 170 pgs.

* cited by examiner

*Primary Examiner* — Schquita D Goodwin
*Assistant Examiner* — Ishrat Rashid

(57) ABSTRACT

A network appliance receives a network packet and determines an application identifier for the network packet. Key specification fetching circuits in the processing stages of the network appliance's match-action pipelines can use the application identifiers to read key specifications. The key specifications are stored in memory and may be cached near the processing stages. Key construction circuits in the processing stages can use the key specifications to construct keys. The processing stages can process the network based on the keys because the keys may be used to obtain action indicators from match-action tables. As such, the processing stages can construct and use keys that may be dynamically defined by storing their key specifications in memory.

20 Claims, 15 Drawing Sheets

METHODS AND SYSTEMS FOR SPECIFYING AND GENERATING KEYS FOR SEARCHING KEY VALUE TABLES

TECHNICAL FIELD

The embodiments relate to computer networks, local area networks, network appliances such as routers, switches, network interface cards (NICs), smart NICs, and distributed service cards (DSCs). The embodiments also relate to packet processing pipelines, application specific integrated circuits implementing packet processing pipelines, match-action pipelines, and to specifying and creating keys that can be used in the processing stages of match-action pipelines.

BACKGROUND

Network appliances process network traffic flows by receiving network packets and processing the network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a network appliance. The P4 domain-specific language for programming the data plane of network appliances is currently defined in the "$P4_{16}$ Language Specification," version 1.2.2, as published by the P4 Language Consortium on May 17, 2021, which is incorporated by reference herein. P4 (also referred to herein as the "P4 specification," the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, processing stages, control flow, extern objects, user-defined metadata, and intrinsic metadata. A P4 pipeline can include processing stages that generate a key, and use the key to perform a table look up. The result of the table look up can identify an action that is to be performed.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented as a network appliance. The network appliance can include a memory that is configured to store a plurality of key specifications, a match-action pipeline that includes a processing stage, a key specification fetch circuit that is in the processing stage, and a key construction circuit that is in the processing stage, wherein the network appliance receives a network packet that includes header data, the network appliance determines an application identifier for the network packet, the key specification fetch circuit uses the application identifier to read a key specification that is one of the key specifications, the key specification is one of the key specifications, the key construction circuit uses the key specification to construct a key from the header data, the processing stage uses the key to obtain an action indicator from a key-value table; the processing stage processes the network packet based on the action indicator.

Another aspect of the subject matter described in this disclosure can be implemented in a method. The method can include storing a plurality of key specifications in a memory, receiving a network packet that includes header data, determining an application identifier for the network packet, reading a key specification for the network packet based on the application identifier, constructing a key from the header data based on the key specification, using the key to identify a processing action, and processing the network packet by performing the processing action, wherein the key specification is one of the key specifications, and a processing stage of a match-action pipeline reads the key specification, constructs the key, identifies the processing action, and processes the network packet.

Yet another aspect of the subject matter described in this disclosure can be implemented in a system. The system can include a means for storing a plurality of means for specifying a plurality of keys, a means for receiving a network packet that includes header data, a means for identifying an application for the network packet, a means for reading a means for specifying a key for the network packet, a means for constructing the key from the header data based on the means for specifying the key, a means for using the key to identify a processing action, and a means for performing the processing action to process the network packet, wherein the means for specifying a key for the network packet is one of the means for specifying a plurality of keys.

In some implementations of the methods and devices, a predicate circuit produces the application identifier. In some implementations of the methods and devices, a network appliance includes a key specification caching circuit that is configured to cache a subset of the key specifications. In some implementations of the methods and devices, the key specification is cached in the key specification caching circuit, and the key specification caching circuit provides the key specification to the key construction circuit. In some implementations of the methods and devices, a cache miss indicates that the key specification is not cached in the key specification caching circuit, and the key specification is read from the memory and cached in the key specification caching circuit. In some implementations of the methods and devices, a cache miss causes the match-action pipeline to stall.

In some implementations of the methods and devices, the match-action pipeline includes a second processing stage, the second processing stage includes a second key specification fetch circuit and a second key construction circuit, the processing stage produces a second application identifier, the second key specification fetch circuit uses the second application identifier to read a second key specification, the second key specification is one of the key specifications, the second key construction circuit uses the second key specification to construct a second key, and the second processing stage processes the network packet based on the second key. In some implementations of the methods and devices, the key specification includes a byte select field that indicates a byte in the header data and a location in the key, and the key construction circuit copies the byte in the header data to the location in the key. In some implementations of the methods and devices, the key specification includes a bit select field that indicates a bit in the header data and a location in the key, and the key construction circuit copies the bit in the header data to the location in the key.

In some implementations of the methods and devices, a network appliance includes a table memory that stores a plurality of match-action tables, and a table unit that is in the processing stage, wherein the key specification includes a table properties specification that includes a table indicator, the table indicator indicates a match-action table that is one of the match-action tables, and the table unit uses the key and the table indicator to obtain an action indicator from the match-action table. In some implementations of the methods and devices, a network appliance includes a table unit that is in the processing stage, and a plurality of match processing units that are in the processing stage, wherein the table unit uses the key to obtain an action indicator, the key specification includes a processing unit selection indicator, the processing unit selection indicator is used to select one of the processing units, and the one of the match processing units performs an action that is indicated by the action indicator. In some implementations of the methods and devices, the header data includes an ethertype value in an ethertype field, and the application identifier is based on the ethertype value.

In some implementations of the methods and devices, a predicate circuit uses the header data to determine the application identifier. In some implementations of the methods and devices, the method includes caching a subset of the key specifications in a key specification caching circuit. In some implementations of the methods and devices, a cache miss indicates that the key specification is not cached in the key specification caching circuit, the key specification is read from the memory and cached in the key specification caching circuit, and the cache miss causes the match-action pipeline to stall. In some implementations of the methods and devices, the method includes storing a plurality of match-action tables a table memory, wherein the key specification includes a table properties specification that includes a table indicator, the table indicator indicates a match-action table that is one of the match-action tables, and the processing stage includes a table unit that uses the key and the table indicator to obtain an action indicator from the match-action table.

In some implementations of the methods and devices, a system includes a means for specifying a plurality of header data bits, a means for specifying a location in the key, and a means for copying the plurality of header data bits to the location in the key.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
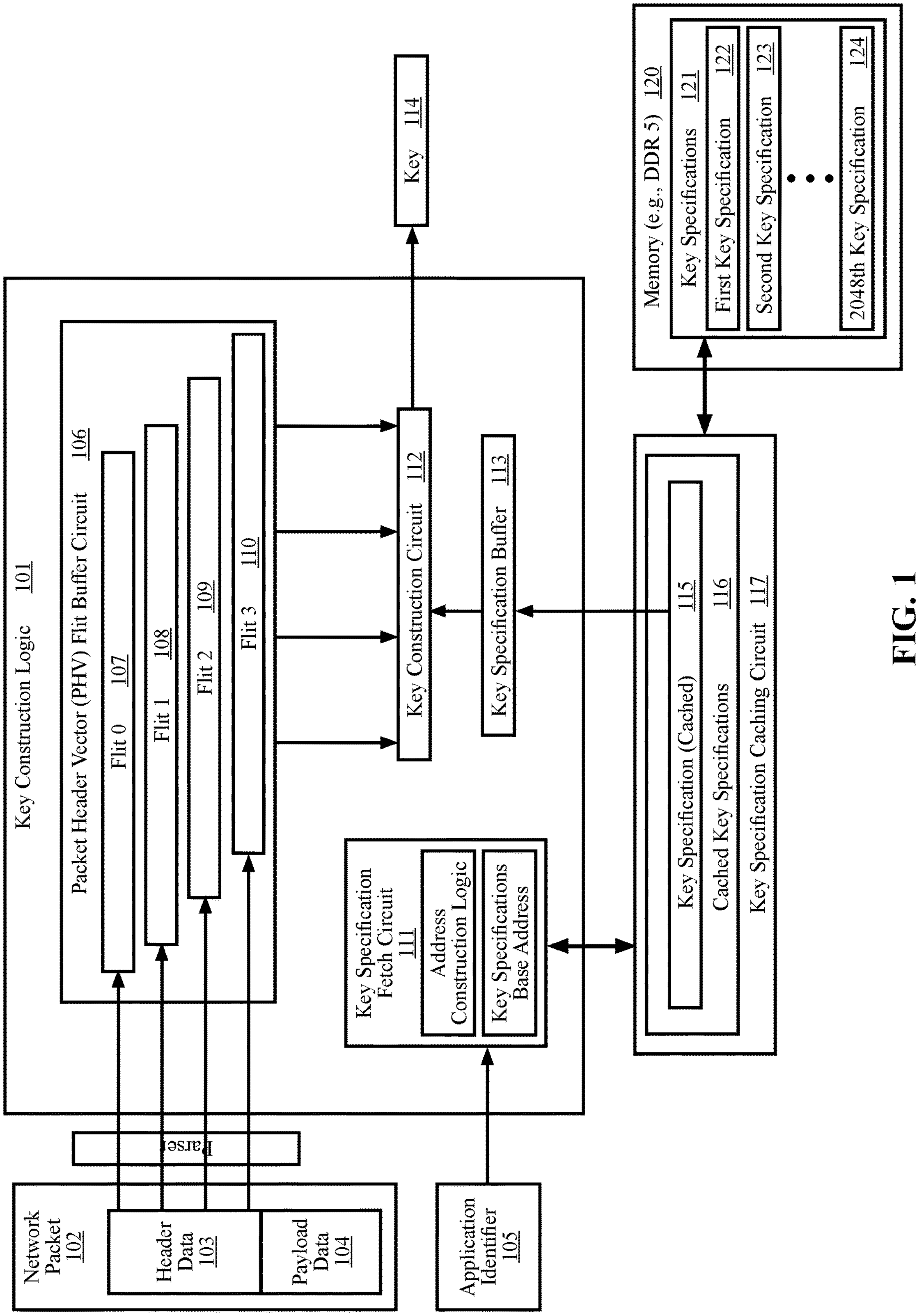
FIG. 1 is a high-level functional diagram illustrating key construction logic constructing a key according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The keys used by table units in the processing stages of match-action pipelines are becoming overloaded due to a limited ability to produce specialized keys for the network packets of the many different network applications that are generating network traffic. The network applications can include transmission control protocol (TCP) sessions, non-volatile memory express over fiber (NVMe-oF) connections, user datagram protocol (UDP) sessions, remote direct memory access (RDMA) connections, etc. The network traffic can be processed by packet processing pipeline circuits such as P4 pipelines implemented as ASICs or in field programmable gate arrays (FPGAs). The packet processing pipeline circuits can have numerous processing stages that each include a table unit and at least one match processing unit (MPU). The table unit may use a packet's contents to produce a key and then use that key to lookup an action indicator in a match-action table. Match-action tables are key-value tables that can be used by the table units. A table unit can use a key to identify an action indicator (e.g., executable code entry point, input parameter for executable code, etc.) because a match-action table associates the action indicator with the key. An MPU, also called an action unit. can use the action indicator for executing an action to process a packet before passing the packet to the next processing stage in the pipeline.

A key must often identify an instance of a network application. For example, a key may be generated that is specific to a particular TCP session. Here, the TCP session is an instance of the TCP application. Such a key may be assembled from packet header field contents that are specific to or well suited for identifying specific TCP sessions. Different packet header field contents may be best suited for identifying specific NVMe-oF connections, which are instances of the NVMe-oF application. As such, the key generation circuit of the MPU may be designed to generate keys that work well for TCP sessions, for NVMe-oF connections, and for other applications. A side effect of having a key that works for many applications is that the key is long because it must contain the information needed for identifying the instances of all those applications. The keys, however, have finite length and longer keys require more time/resources. As the number of applications increases, the key generation logic can no longer generate keys that work well for every application.

Keys that do work well for all the network applications may be generated by using key specifications. Different network applications can be associated with different application identifiers. An application identifier can determine which of the key specifications are to be used by the key construction logic. As such, the keys that are constructed for each application can be specifically designed for identifying specific instances of those applications. A large number of key specifications may be stored in a volatile memory or in a non-volatile memory. The key specification(s) for an application may be fetched for use by the key construction logic when a network packet for that application is received. A key specification caching circuit may reduce delays incurred by fetching key specifications.

One of the advantages of using application specific key specifications is that existing and installed networking hardware may be adapted to handle new network applications by storing new key specifications. Another advantage is that the keys themselves may be shorter, leading to faster processing and less on-chip circuitry.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

FIG. 1 is a high-level functional diagram illustrating key construction logic 101 constructing a key according to some aspects. A network packet 102 can include header data 103 and payload data 104. The key construction logic can include a packet header vector (PHV) flit buffer circuit 106, a key specification fetch circuit 111, a key construction circuit 112, and a key specification buffer 113. The network packet 102 may be received as a bit stream that a parser parses to produce a PHV that may be clocked into the PHV flit buffer circuit 106 where it can be stored in flits such as flit 0 107, flit 1 108, flit 2 109, and flit 3 110. For example, a PHV that is 8192 bits long has 8192 header data bits and can be clocked into four flits that are each 2048 bits long. Therefore, each of the four flits can store 2048 header data bits. The key construction logic can also receive an application identifier 105. The key specification fetch circuit 111 can use the application identifier to determine a key specification address that is the address in memory of the key specification for an application. The key specification fetch circuit 111 may include address construction logic and can store a key specifications base address. The address construction logic may determine an offset (e.g., application identifier*key specification size), and add the offset to the key specifications base address to obtain the key specification address.

The key specifications 121 can be stored in a memory 120 such as a double data rate 5 (DDR 5) synchronous dynamic random-access memory (SDRAM). The key specifications can include a first key specification 122, a second key specification 123, and many more key specifications. The non-limiting example of FIG. 1 shows that the last key specification stored in memory 120 is the 2048th key specification 124.

The key specification fetch circuit may use the key specification address to fetch a key specification from the memory 120. Here, a normal memory read operation fetches the key specification. Alternatively, the key specification fetch circuit may attempt to fetch the key specification from a key specification caching circuit 117 that stores cached key specifications 116. When the key specification is in the key specification caching circuit, the key specification caching circuit can provide the key specification to the key construction circuit via the key specification fetch circuit 111. The cached key specifications 116 are a subset of the key specifications stored in the memory. For example, there may be 2048 key specifications stored in memory whereas the key specification caching circuit may be sized to cache at most 64 cached key specifications. The key specification 115 is one of the cached key specifications 116. As such, the key specification caching circuit 117 returns the key specification which is then stored in key specification buffer 113. The key construction circuit 112 uses header data stored in the PHV flit buffer circuit 106 and the key specification stored in the key specification buffer 113 to construct a key 114.

When the key specification is not in the key specification caching circuit 117, the key specification caching circuit 117 may read the key specification from memory 120. In such cases, the key specification caching circuit 117 may issue a cache miss. A cache miss may stall the key construction logic 101, an MPU that includes the key construction logic 101, and even the packet processing pipeline that includes that MPU. It is therefore clear that the key specification caching circuit 117 may be a critical component that prevents the packet processing pipeline from stalling while waiting for key specifications to be fetched from memory 120.

Figure 2:
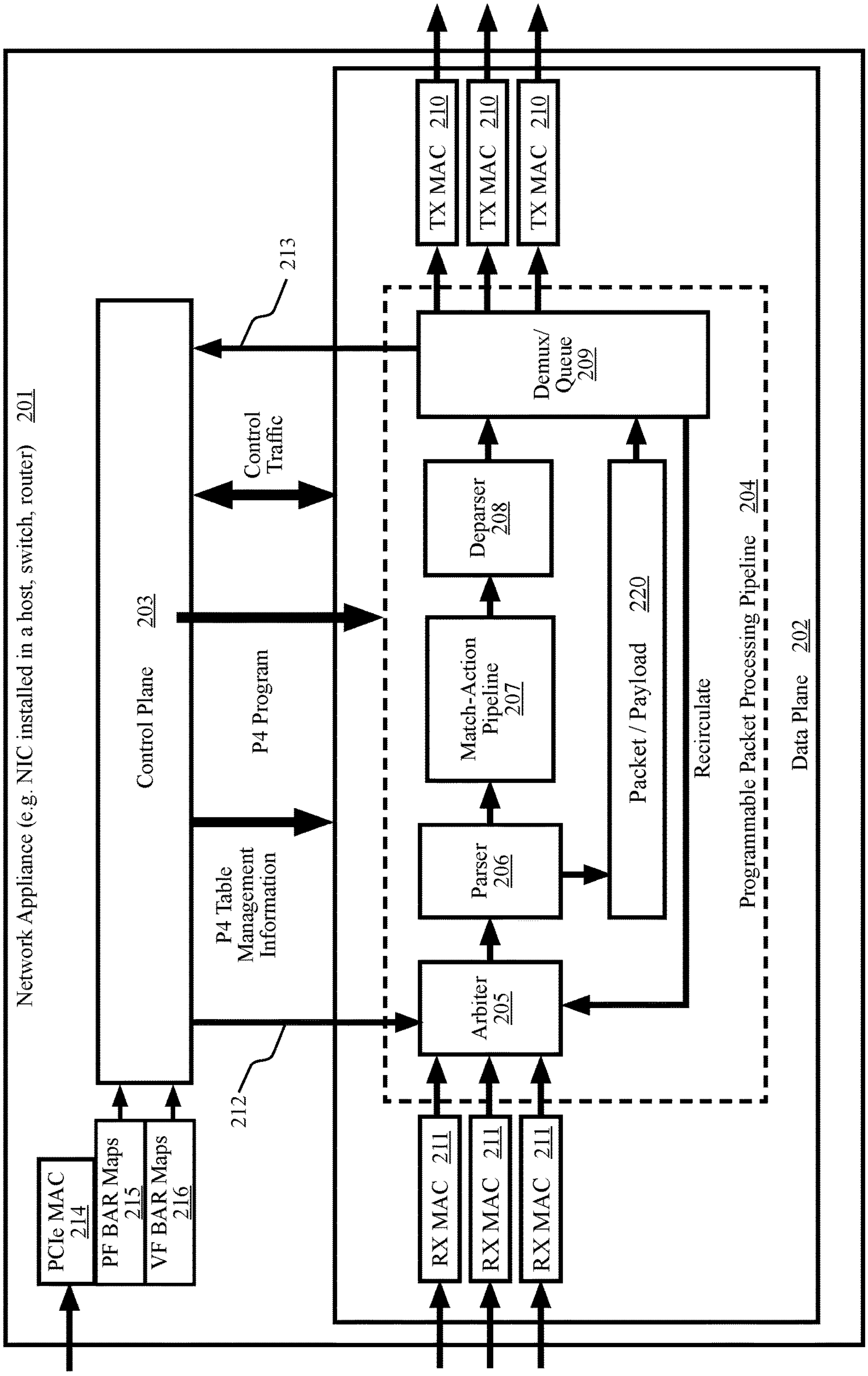
FIG. 2 is a functional block diagram of a network appliance having a control plane and a data plane and in which aspects may be implemented.

FIG. 2 is a functional block diagram of a network appliance having a control plane and a data plane and in which aspects may be implemented. A network appliance 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIB s) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The document "$P4_{16}$ Language Specification," version 1.2.2, published by the P4 Language Consortium on May 17, 2021, which is incorporated by reference herein, describes the P4 domain-specific language that can be used for programming the data plane of network appliances. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, processing stages, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 202 includes a programmable packet processing pipeline 204 that is programmable using a domain-specific language such as P4 and that can be used to implement the programmable packet processing pipeline 204. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output CPU port 213. The control plane is often referred to as a CPU (central processing unit) although, in practice, control planes often include multiple CPU cores and other elements. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A network appliance 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-MY) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 3:
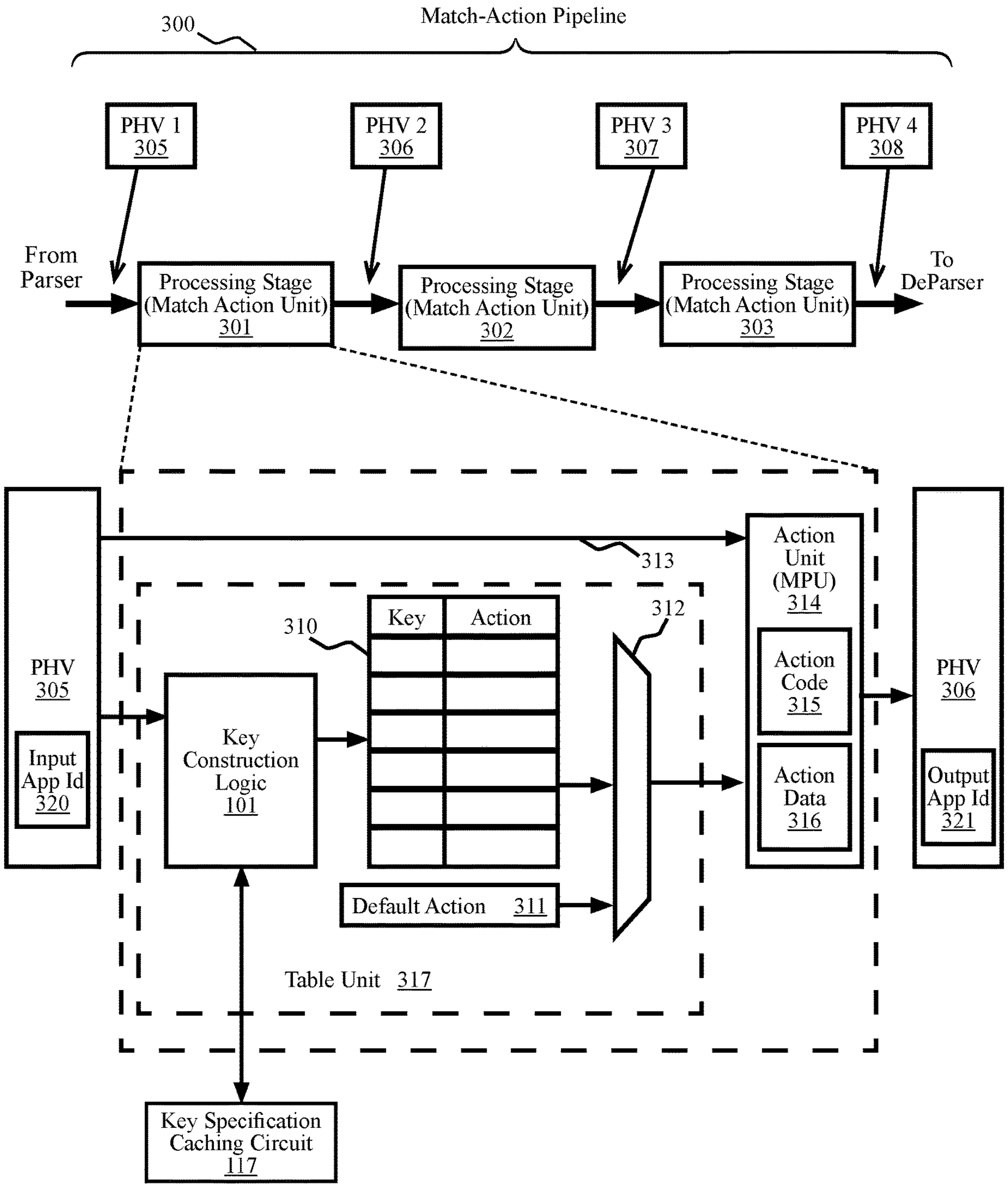
FIG. 3 is a functional block diagram illustrating an example of a processing stage in a match-action pipeline according to some aspects.

FIG. 3 is a functional block diagram illustrating an example of a processing stage 301 in a match-action pipeline 300 according to some aspects. FIG. 3 introduces certain concepts related to processing stages and match-action pipelines and is not intended to be limiting. The processing stages are also referred to as match-action units. The processing stages 301, 302, 303 of the match-action pipeline 300 are programmed to perform "match-action" operations in which a table unit performs the match and the MPUs perform the actions. The table unit can perform the match by using at least a portion of the PHV to look up an action indicator. The MPUs, also called action units, can perform the action based on the action indicator that is output from the table unit. A processing stage may include more than one MPU. A PHV generated at the parser may be passed through each of the processing stages in the match-action pipeline in series and each processing stage can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. The first processing stage 301 receives PHV 1 305 as an input and outputs PHV 2 306. The second processing stage 302 receives PHV 2 306 as an input and outputs PHV 3 307. The third processing stage 303 receives PHV 3 307 as an input and outputs PHV 4 308.

An expanded view of elements of a processing stage 301 of match-action pipeline 300 is shown. The processing stage includes a table unit 317 that operates on an input PHV 305 and an action unit 314 (also called an MPU) that produces an output PHV 306, which may be a modified version of the input PHV 305. The table unit 317 can include key construction logic 101, a lookup table 310, and selector logic 312. The key construction logic 101 is configured to generate a key from an input application identifier 320 and at least one field in the PHV (e.g., 5-tuple, InfiniBand queue pair identifiers, etc.). The PHV is illustrated as including the input application identifier 320. However, the input application identifier 320 may be provided to the key construction logic 101 using a different input. The output PHV 306 is shown containing an output application identifier 321 that may be different from the input application identifier 320 because the MPU may change the application identifier. The output application identifier 321 may alternatively be passed by some other means to the next processing stage. The lookup table 310 is populated with key-action pairs, where a key-action pair can include a key (e.g., a lookup key) and a corresponding action indicator such as an action code 315 and/or action data 316. A P4 lookup table may be viewed as a generalization of traditional switch tables, and can be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the processing stage can be programmable by the control plane via P4 and the contents of the lookup table can be managed by the control plane.

Figure 4:
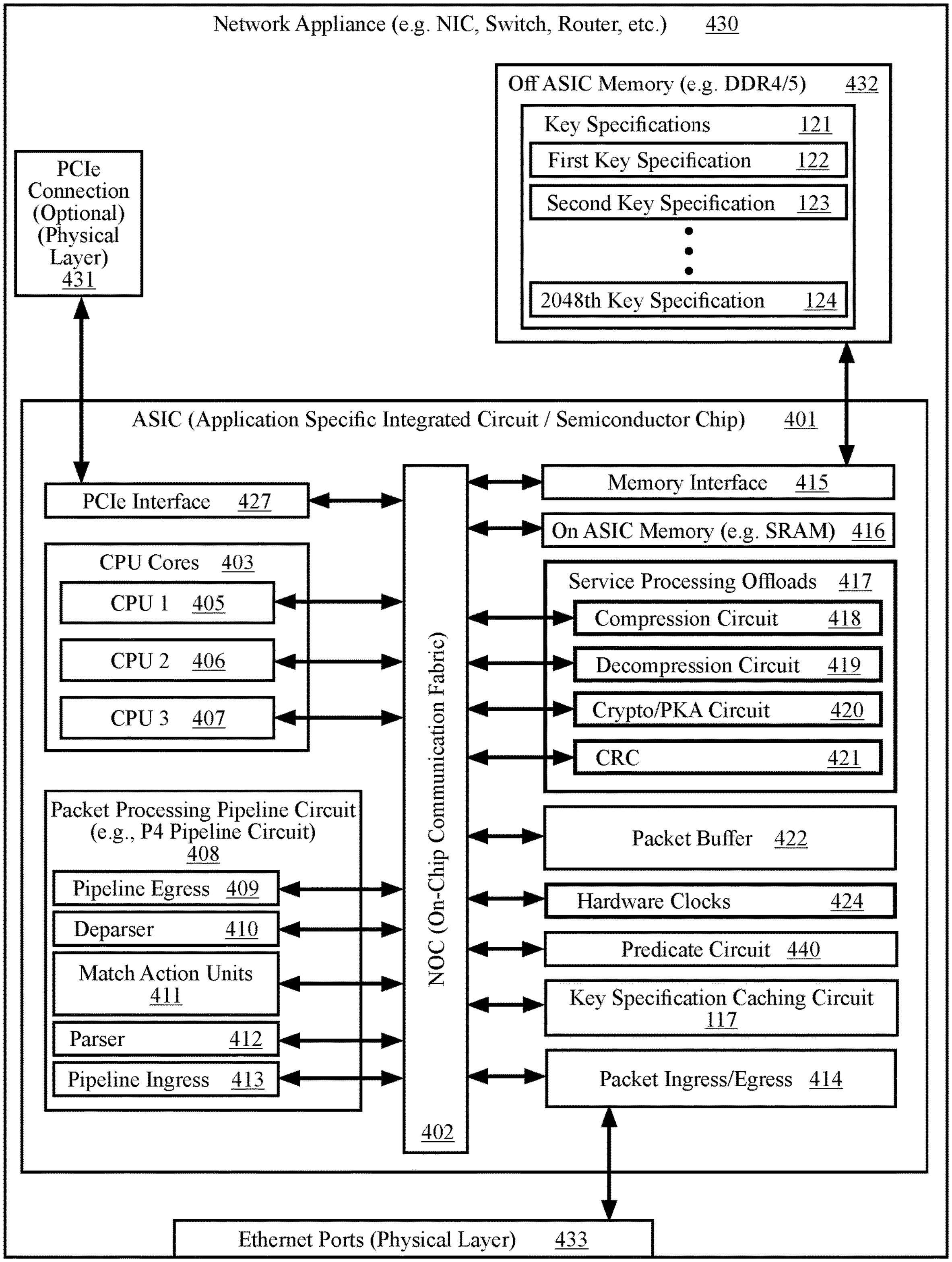
FIG. 4 is a functional block diagram of a network appliance having an application specific integrated circuit (ASIC), according to some aspects.

FIG. 4 is a functional block diagram of a network appliance 430 having an application specific integrated circuit (ASIC) 401, according to some aspects. If the network appliance is a network interface card (NIC) then the NIC can be installed in a host computer and can act as a network appliance for the host computer and for virtual machines running on the host computer. Such a NIC can have a PCIe connection 431 for communicating with the host computer. The network appliance 430 can have an ASIC 401, off ASIC memory 432, and ethernet ports 433. The off ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used advanced extensible interface (AXI) bus. The ASIC's core circuits can include a PCIe interface 427, CPU cores 403, P4 packet processing pipeline 408 elements, memory interface 415, on ASIC memory such as static random-access memory (SRAM) 416, service processing offloads 417, a packet buffer 422, extended packet processing pipeline 423, predicate circuit 440, key specification caching circuit 117, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline circuit 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a cyclic redundancy check (CRC) calculation circuit 421. The specific core circuits implemented within the non-limiting example of ASIC 401 can be selected such that the ASIC implements many, perhaps all, of the functionality of an InfiniBand channel adapter, of an NVMe card, and of a network appliance that processes network traffic flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The P4 packet processing pipeline circuit 408 is a specialized set of elements for processing network packets such as IP (internet protocol) packets and InfiniBand PDUs (protocol data units). The P4 pipeline can be configured using a domain-specific language such as the P4 domain specific language. As described in the P4 specification, the primary abstractions provided by the P4 language relate to header types, parsers, tables, actions, match-action units, processing stages, control flow, extern objects, user-defined metadata, and intrinsic metadata.

The network appliance 430 can include a memory 432 for running Linux or some other operating system and for storing data used by the processes implementing network services, upgrading the control plane, and upgrading the data plane. The network appliance can use the memory 432 to store key specifications 121 such as the first key specification 122, the second key specification 123, and the last key specification (e.g., the 2048th key specification). The key specifications may be fetched from the memory 432 via the key specification caching circuit 117. The key specification caching circuit 117 is illustrated as a caching circuit that is close to the packet processing pipeline circuit 408 and that is separate from other caching circuits that the ASIC may have. An advantage of including a dedicated caching circuit that is the key specification caching circuit 117 is that the pipeline 408 may fetch cached key specification without interference from other traffic on the NOC 402. In some implementations, the pipeline 408 may fetch key specifications directly from the key specification caching circuit 117 without traversing the NOC 402. Other implementations may have a memory cache (e.g., in the memory interface, in the on ASIC memory, etc.) that includes the key specification caching circuit 117.

The key construction logic 101 can use an input application identifier 320 to select which key specification to use for constructing a key 114. The predicate circuit 440 may generate the input application identifier 320. FIG. 4 shows the predicate circuit outside of the packet processing pipeline circuit 408. In some implementations, the predicate circuit 440 is part of the packet processing pipeline circuit 408 where it may use the output of the parser 412 to produce the input application identifier 320. In other implementations, the predicate circuit 440 may be outside of the packet processing pipeline circuit 408 where it may generate input application identifiers for packets before they are processed by the packet processing pipeline circuit 408. For example, a newly arrived packet may be queued for processing by the predicate circuit and, after its input application identifier has been generated, queued for processing by the packet processing pipeline circuit 408.

The CPU cores 403 can be general purpose processor cores, such as ARM processor cores, microprocessor without interlocked pipelined stages (MIPS) processor cores, and/or x86 processor cores, as is known in the field. Each CPU core can include a memory interface, an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuit 408.

The packet processing pipeline circuit 408 can be a specialized circuit or part of a specialized circuit using one or more ASICs or FPGAs to implement programmable packet processing pipelines such as the programmable packet processing pipeline 204 of FIG. 2. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

All memory transactions in the network appliance 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuit 408, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
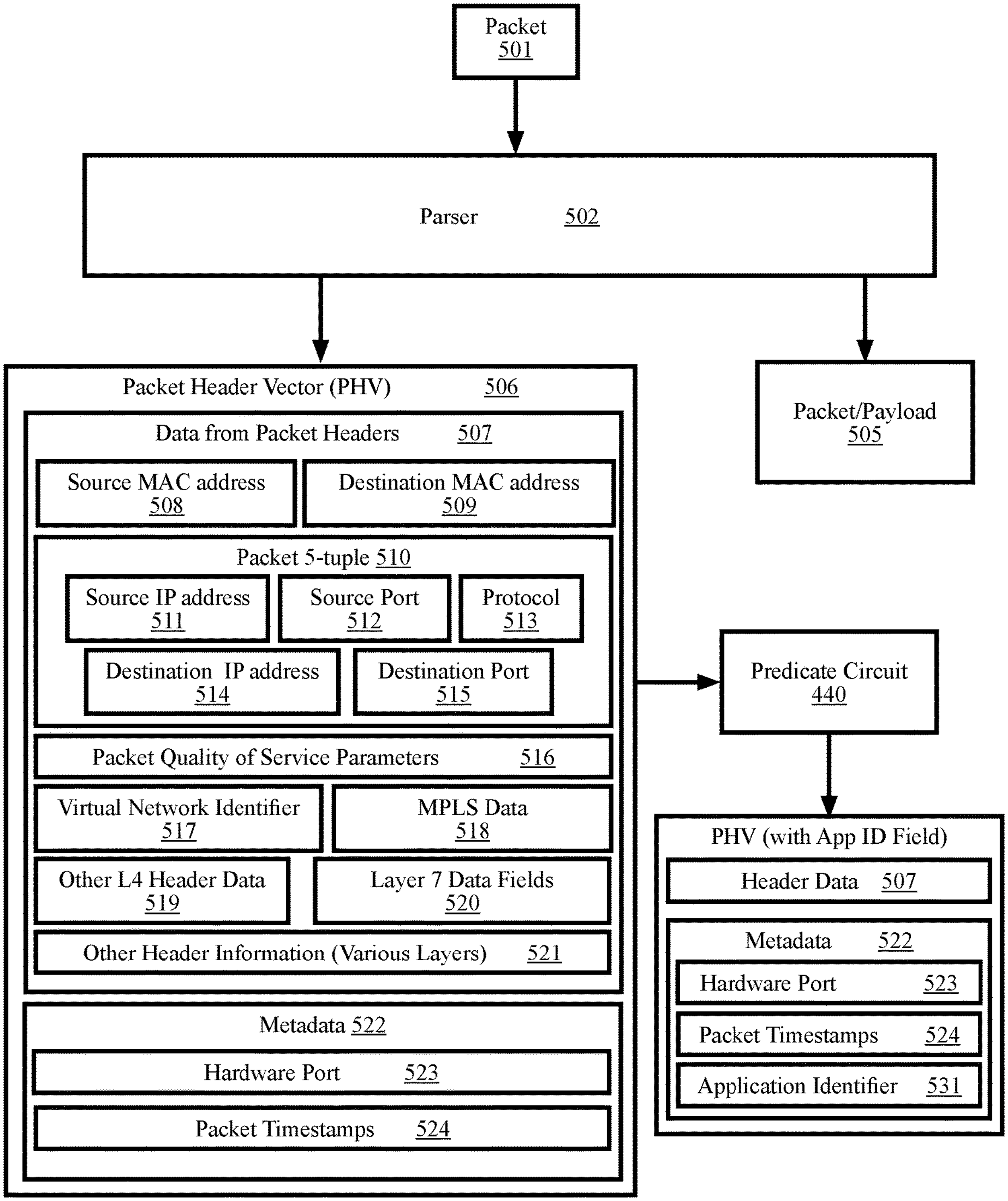
FIG. 5 is a high-level diagram illustrating an example of generating a packet header vector (PHV) from a packet according to some aspects.

FIG. 5 is a high-level diagram illustrating an example of generating a packet header vector 506 from a packet 501 according to some aspects. The parser 502 can receive a packet 501 that has layer 2, layer 3, layer 4, and layer 7 headers and payloads. The parser can generate a packet header vector (PHV) from packet 501. The packet header vector 506 can include many data fields including data from packet headers 507 and metadata 522. The metadata 522 can include data generated by the network appliance such as the hardware port 523 on which the packet 501 was received and the packet timestamps 524 indicating when the packet 501 was received by the network appliance, enqueued, dequeued, etc.

The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The virtual network identifier 517 may be obtained from the packet's layer 2 header. The multi-protocol label switching (MPLS) data 518, such as an MPLS label, may be obtained from the packet's layer 2 header. The other layer 4 data 519 can be obtained from the packet's layer 4 header. The L7 data fields 520 can be obtained from the packet's layer 7 header or layer 7 payload. The L7 data fields 520 can be obtained from the packet's layer 7 header or layer 7 payload. The other header information 521 is the other information contained in the packet's layer 2, layer 3, layer 4, and layer 7 headers.

The packet 5-tuple 510 is often used for generating keys. The packet 5-tuple 510 can include the source IP address 511, the source port 512, the protocol 513, the destination IP address 514, and the destination port 515. Those practiced in computer networking protocols realize that the headers carry much more information than that described here, realize that substantially all of the headers are standardized by documents detailing header contents and fields, and know how to obtain those documents. The parser can also be configured to output a packet or payload 505. Recalling that the parser 502 is a programmable element that is configured through the domain-specific language (e.g., P4) to extract information from a packet, the specific contents of the packet or payload 505 are those contents specified via the domain specific language. For example, the contents of the packet or payload 505 can be the layer 3 payload.

A predicate circuit 440 can use the data in the PHV 506 to generate an application identifier 531. FIG. 5 shows a predicate circuit that is augmenting the PHV 506 by generating an application identifier 531 and incorporating the application identifier 531 in the PHV 506. The application identifier 531 generated by the predicate circuit 440 can be used as an input application identifier 320.

Figure 6:
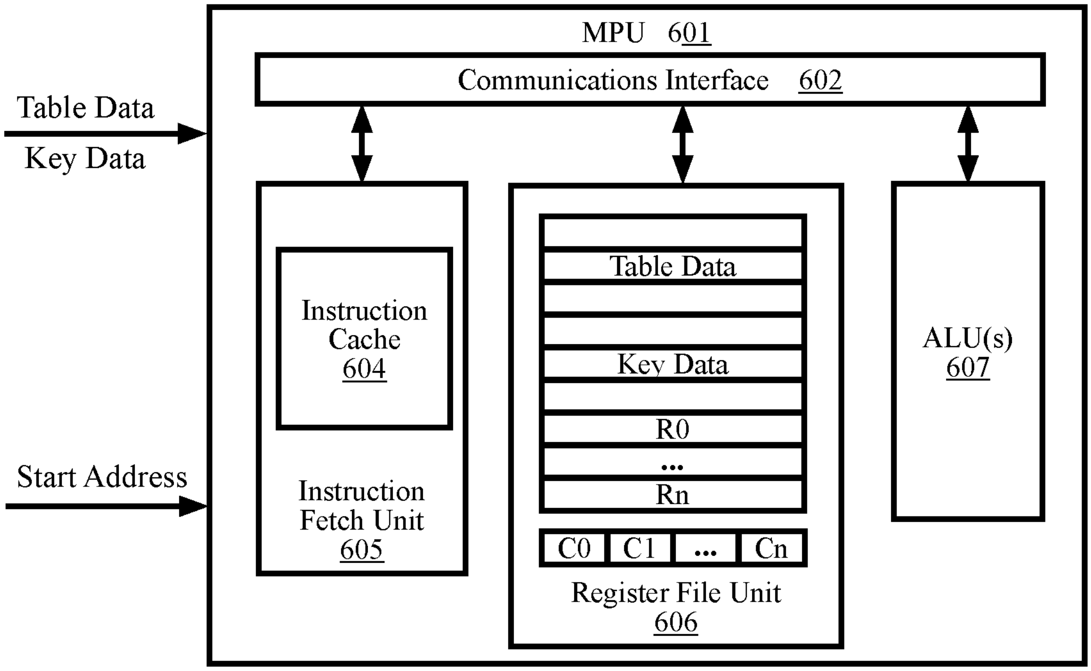
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table unit. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table unit. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any processing stage.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a processing stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general-purpose registers from the host memory.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
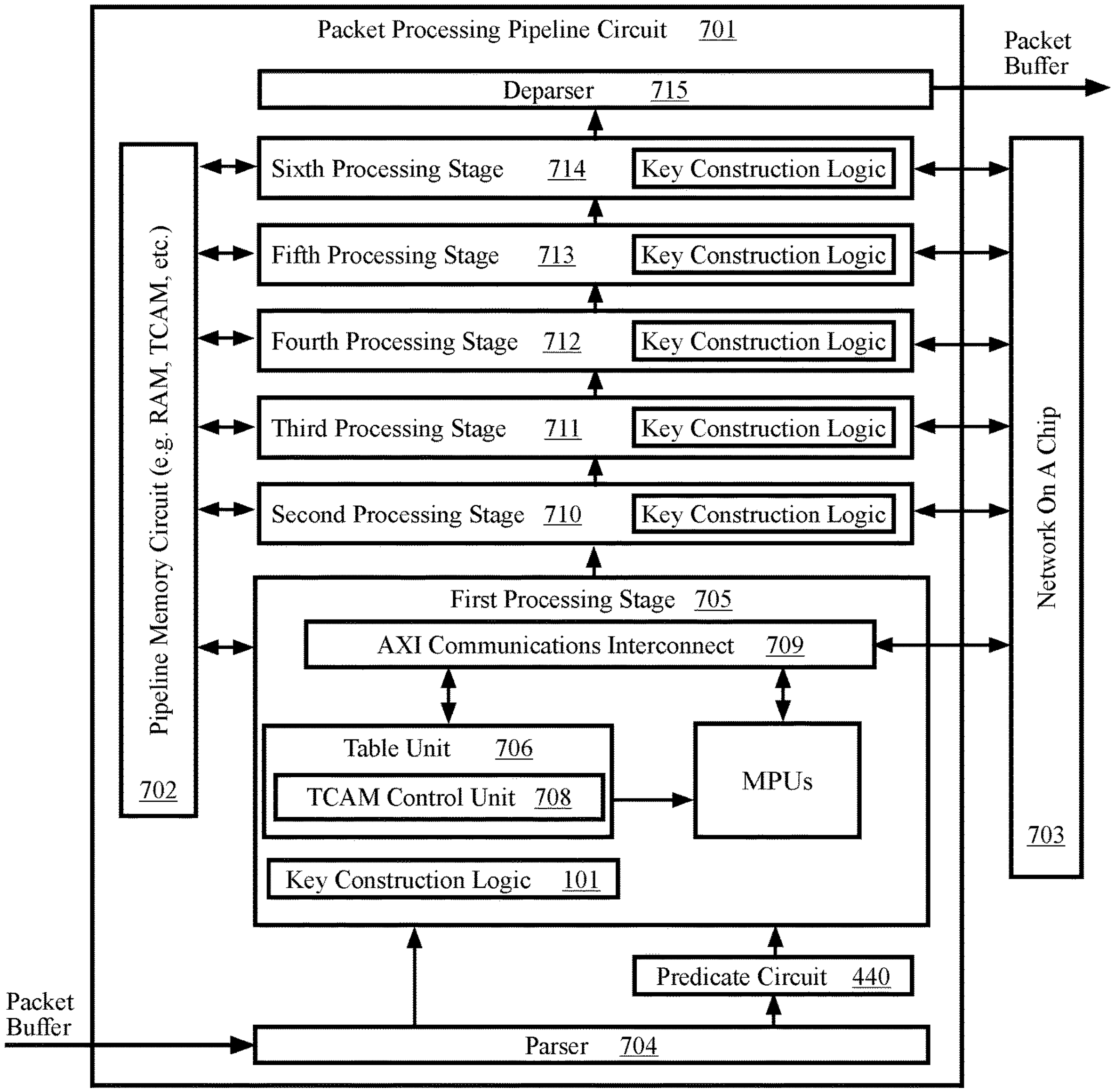
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. A P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and execution stages (i.e., match-action) that can be mapped onto the table units and MPUs. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through processing stages (e.g., processing stages 705, 710, 711, 712, 713, 714) of the match-action pipeline. Each processing stage can be configured to match one or more PHV fields to tables and to update the PHV, table entries, or other data according to the actions specified by the P4 program. If the required number of processing stages exceeds the implemented number of processing stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The network appliance 430 of FIG. 4 has a P4 pipeline that can be implemented via a packet processing pipeline circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the processing stages 705, 710, 711, 712, 713, 714 can be the same as the MPU 601 of FIG. 6. Processing stages can have any number of MPUs. The processing stages of a match-action pipeline can all be identical.

A table unit 706 may be configured to support per-stage table match. For example, the table unit 706 may be configured to hash, lookup, and/or compare keys to table entries. The table unit 706 may be configured to control the address and size of the table, use PHV fields to generate a lookup key, and find Session Ids or MPU instruction pointers that define the P4 program associated with a table entry. A table result produced by the table unit can be an action indicator that is distributed to the multiple MPUs.

The table unit 706 can be configured to control a table selection. In some cases, upon entering a processing stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table unit 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a processing stage. The TCAM search index results may be forwarded to the table unit for SRAM lookups.

The table unit 706 may be implemented by hardware or circuitry. The table unit may be hardware defined. In some cases, the results of table lookups or table results are provided to the MPU in its register file.

A match-action pipeline can have multiple processing stages such as the six processing stages illustrated in the example of FIG. 7. In practice, a match-action pipeline can have any number of processing stages. The processing stages can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

A packet processing pipeline can have many processing stages. For example, each of the processing stages 705, 710, 711, 712, 713, 714 is a match-action unit of the match-action pipeline implemented by the packet processing circuit 701 illustrated in FIG. 7. Each of the match-action units can contain key construction logic. The predicate circuit 440 can generate the application identifier that is used as the input application identifier for the first processing stage 705. The first processing stage 705 can produce an output application identifier that is used by the second processing stage 710 as an input application identifier. Similarly, the third processing stage 711, the fourth processing stage 712, the fifth processing stage 713, and the sixth processing stage 714 can receive their input application identifiers from the preceding processing stage. Each of the processing stages can change the header data 507 and the metadata 522 of a PHV while the processing stage is processing that PHV. As such, each one of the processing stages may generate a new application identifier that it provides to the subsequent processing stage.

Figure 8:
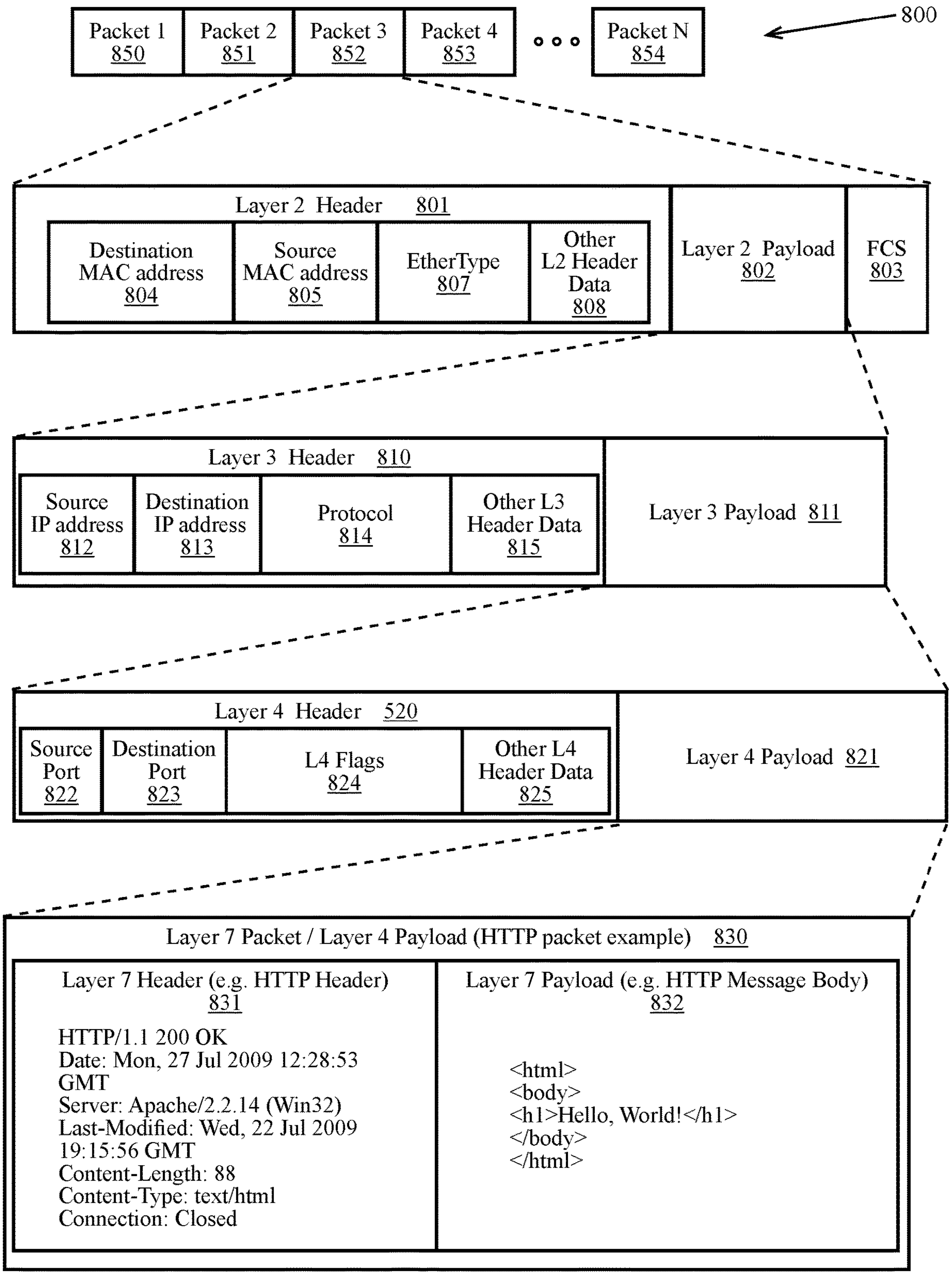
FIG. 8 illustrates packet headers and payloads of packets for network traffic flows including layer 7 fields according to some aspects.

FIG. 8 illustrates packet headers and payloads of packets for a network flow 800 including layer 7 fields according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 801, a layer 2 payload 802, and a layer 2 frame check sequence (FCS) 803. The layer 2 header can contain a source MAC address 805, a destination MAC address 804, an ethertype 807, and other layer 2 header data 808. The input ports 211 and output ports 210 of a network appliance 201 can have MAC addresses. A network appliance 201 can have a MAC address that is applied to all or some of the ports. Alternatively, a network appliance may have one or more ports that each have their own MAC address. In general, each port can send and receive packets. As such, a port of a network appliance can be configured with a RX MAC 211 and a TX MAC 210. Ethernet, also known as Institute of Electrical and Electronics Engineers (IEEE) 802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors.

The ethertype field is a two octet field in network packets such as IEEE 802.3 packets (ethernet) and IEEE 802.11 packets (WiFi). The ethertype of a packet is indicated by the ethertype value held in the ethertype field. The ethertype of a packet indicates which protocol is encapsulated in the layer 2 payload 802. The ethertype values used to identify the various protocols have been standardized by the Internet Engineering Task Force (IETF) and are widely published in the networking literature.

The internet layer, often called layer 3, is the network layer where layer 3 packets can be routed from a first node to a second node across multiple intermediate nodes. The nodes can be network appliances such as network appliance 201. Internet protocol (IP) is a commonly used layer 3 protocol. The layer 3 packet can have a layer 3 header 810 and a layer 3 payload 811. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 805 indicating the first node, a destination MAC address 804 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 805 indicating the intermediate node, a destination MAC address 804 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet can have a layer 4 header 820 and a layer 4 payload 821. The layer 4 header 820 can include a source port 822, destination port 823, layer 4 flags 824, and other layer 4 header data 825. The source port and the destination port can be integer values used by host computers to deliver packets to application programs configured to listen to and send on those ports. The layer 4 flags 824 can indicate a status of or action for a network traffic flow. A layer 4 payload 821 can contain a layer 7 packet.

The application layer, often called layer 7, includes the protocols used by most applications for providing user services or exchanging application data over the network connections established by the lower level protocols. Examples of application layer protocols include RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 821 may include a layer 7 packet 830. A layer 7 packet can have a layer 7 header 831 and a layer 7 payload 832. The illustrated layer 7 packet is an HTTP packet. The layer 7 header 831 is an HTTP header, and the layer 7 payload 832 is an HTTP message body. The HTTP message body is illustrated as a hypertext markup language (HTML) document. HTTP is specified in requests for comment (RFCs) published by the Internet Engineering Task Force (IETF). IETF RFC 7231 specifies HTTP version 1.1. IETF RFC 7540 specifies HTTP version 2. HTTP version 3 is not yet standardized, but a draft standard has been published by the IETF as "draft-ietf-quic-http-29". HTML is a "living" standard that is currently maintained by Web Hypertext Application Technology Working Group (WHATWG). The HTTP header can be parsed by a P4 pipeline because it has a well-known format having well known header fields. Similarly, HTML documents can be parsed, at least in part, by a P4 pipeline to the extent that the HTML document has specific fields, particularly if those specific fields reliably occur at specific locations within the HTML document. Such is often the case when servers consistently respond by providing HTML documents.

Figure 9:
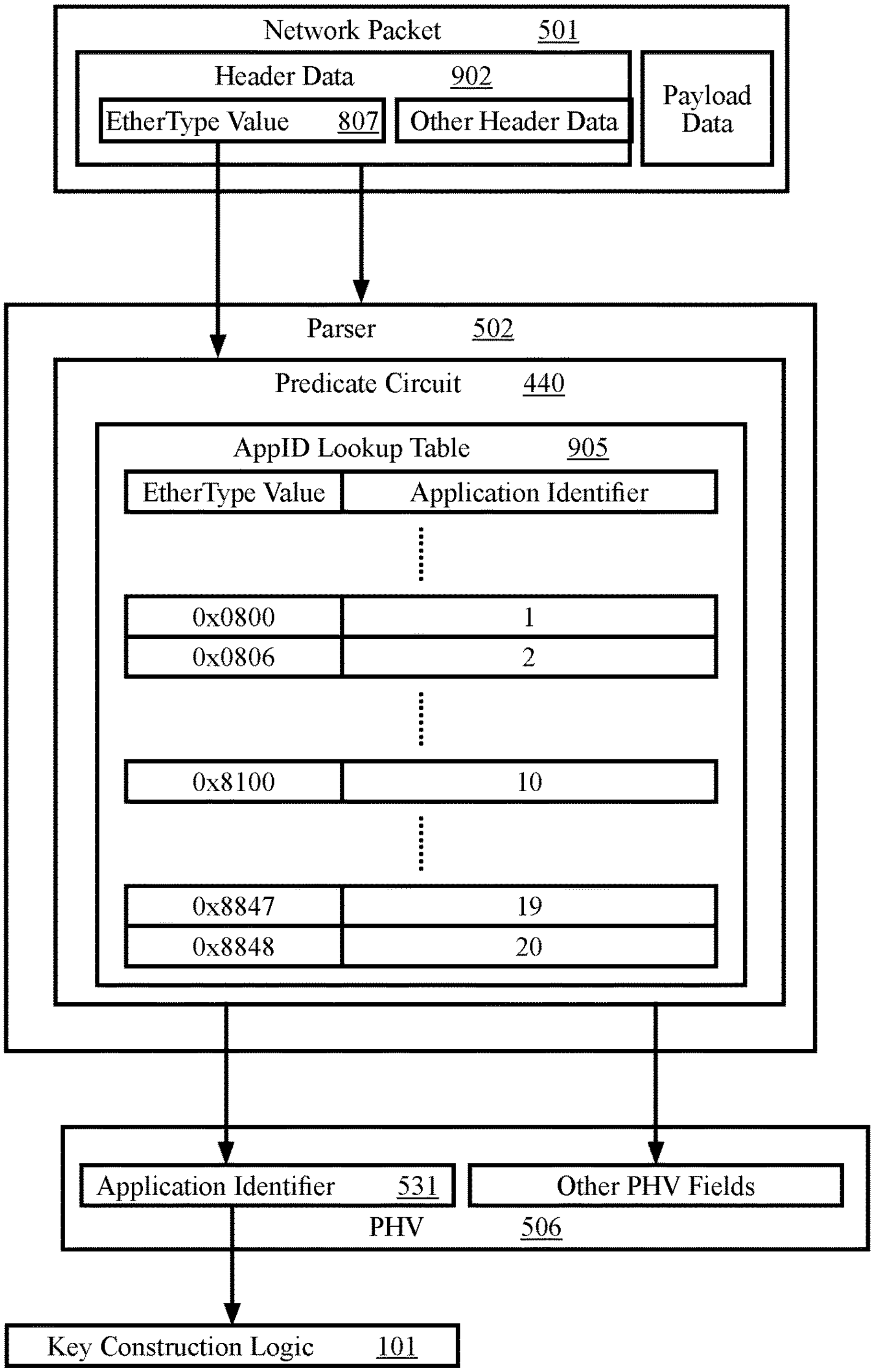
FIG. 9 illustrates a predicate circuit generating an application identifier according to some aspects.

FIG. 9 illustrates a predicate circuit 440 generating an application identifier 531 according to some aspects. FIG. 9 illustrates a parser 502 that includes a predicate circuit 440. The parser 502 can receive a network packet 501 that includes header data 902 and payload data. The header data 902 can include the ethertype value 807 and other header data. The parser 502 can obtain the values contained in each of the packet's header fields such as layer 2 header fields, layer 3 header fields, layer 4 header fields, layer 7 header fields, etc. The predicate circuit 440 can use any one or any combination of the header field values to produce an application identifier. In practice, only one or a few values from the layer 2 header fields and layer 3 header fields is used in order to keep the predicate circuit small and fast. The example illustrated in FIG. 9 uses a single layer 2 header field, ethertype, to generate an application identifier. The predicate circuit 440 can contain an application identifier lookup table 905. The application identifier lookup table 905 can be a key-value table. The ethertype value 807 can be used as the key. As such, the application identifier lookup table 905 maps ethertype values to application identifiers. The application identifiers are illustrated as integers having much lower values then the ethertype values (e.g., 1 is much lower than 0x0800). The key construction logic 101 may use the application identifiers as indexes into consecutively stored key specifications. For example, the key specification to be used may be located at an address that equals a base address+(key specification size×application identifier). The parser 502 can produce a PHV 506 that includes the application identifier 531 and other PHV fields.

Figure 10:
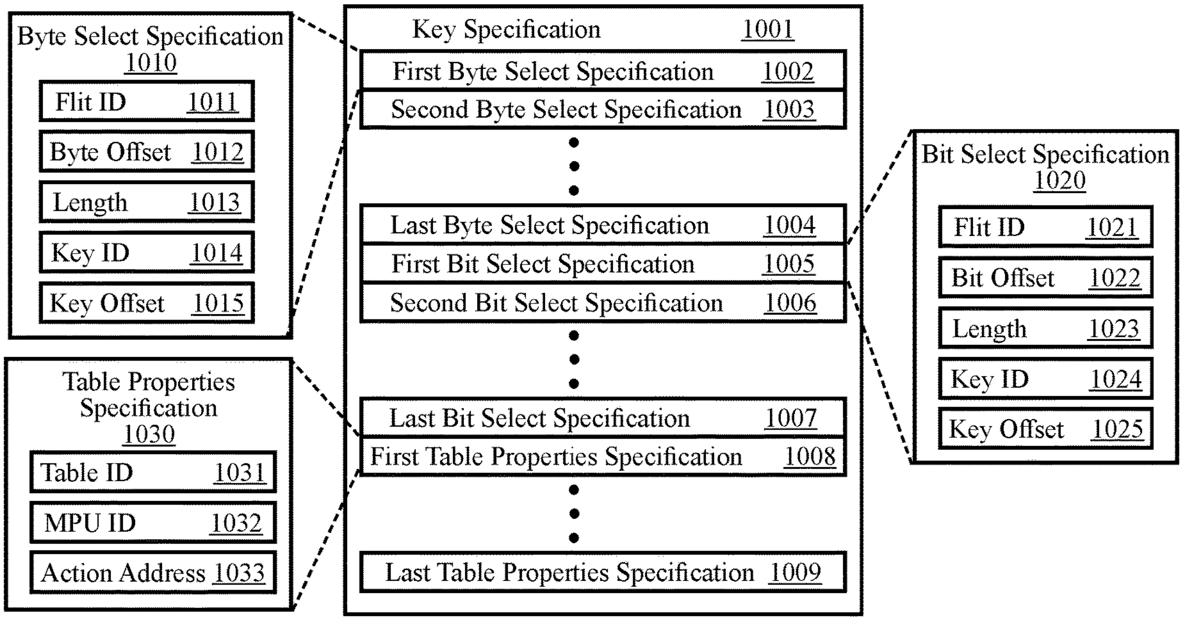
FIG. 10 illustrates data fields that can be included in a key specification according to some aspects.

FIG. 10 illustrates data fields that can be included in a key specification 1001 according to some aspects. The key specification 1001 can include byte select specifications, bit select specifications, and table properties specifications. Byte select specifications such as the first byte select specification 1002, the second byte select specification 1003 and the last byte select specification 1004, can contain byte select specifications. A byte select specification, such as byte select specification 1010, can include a flit identifier 1011, a byte offset 1012, a length 1013, a key identifier 1014, and a key offset 1015. The flit identifier 1011 can indicate a flit, a byte offset 1012 can indicate a byte in a flit, and the length 1013 can indicate a number of bytes. Flits can be portions of a PHV. For example, a PHV that is 8192 bits long can be clocked into four flits that are each 2048 bits long. The flit identifier can indicate one of those four flits. The byte(s) specified by the flit identifier, byte offset, and length values are to be copied into a key. The key construction logic may construct more than one key. The key identifier indicates the key into which the bytes are to be copied. The key offset indicates where into the key the bytes are to be copied.

The key specification can include bit select specifications such as the first bit select specification 1005, the second bit select specification 1006, and the last bit select specification 1007. A bit select specification, such as bit select specification 1020, can include a flit identifier 1021, a bit offset 1022, a length 1023, a key identifier 1024, and a key offset 1025. The flit identifier 1021 can indicate a flit. A bit offset 1022 can indicate a bit in a flit. The length 1023 can indicate a number of bits. The bit(s) specified by the flit identifier, bit offset, and length values are to be copied into a key. The key identifier indicates the key into which the bits are to be copied. The key offset indicates where into the key the bits are to be copied.

The key specification can include table properties specifications such as the first table properties specification 1008, and the last table properties specification 1009. A table properties specification, such as table properties specification 1030, can include a table identifier 1031, a MPU identifier 1032, and an action address 1033. FIG. 7 shows processing stages that have a single table unit and a single MPU. In practice, the processing stages often have numerous MPUs. The MPU identifier 1032 can indicate one of the MPUs. For example, the MPU identifier may be an MPU distribution mask (e.g., "1001" identifies MPU 0 and MPU 3), or may be an integer (e.g., "2" identifies MPU 2). As discussed above, the key construction logic generates a key that is used to look up a value in a table. The table identifier 1031 indicates a table such that the key can be used to look up a value in the table indicated by the table identifier. That value can be sent to the MPU identified by the MPU identifier. The action address 1033 can indicate an action to be performed by the MPU identified by the MPU identifier. For example, the action address can be an address of the code that is to be executed by the MPU and the MPU can jump to that address. The key is used to look up a value in the table indicated by the table identifier 1031. That value and the action address 1033 can be sent to the MPU identified by the MPU identifier. That MPU can perform the indicated action and use the value as an input to the indicated action.

Figure 11:
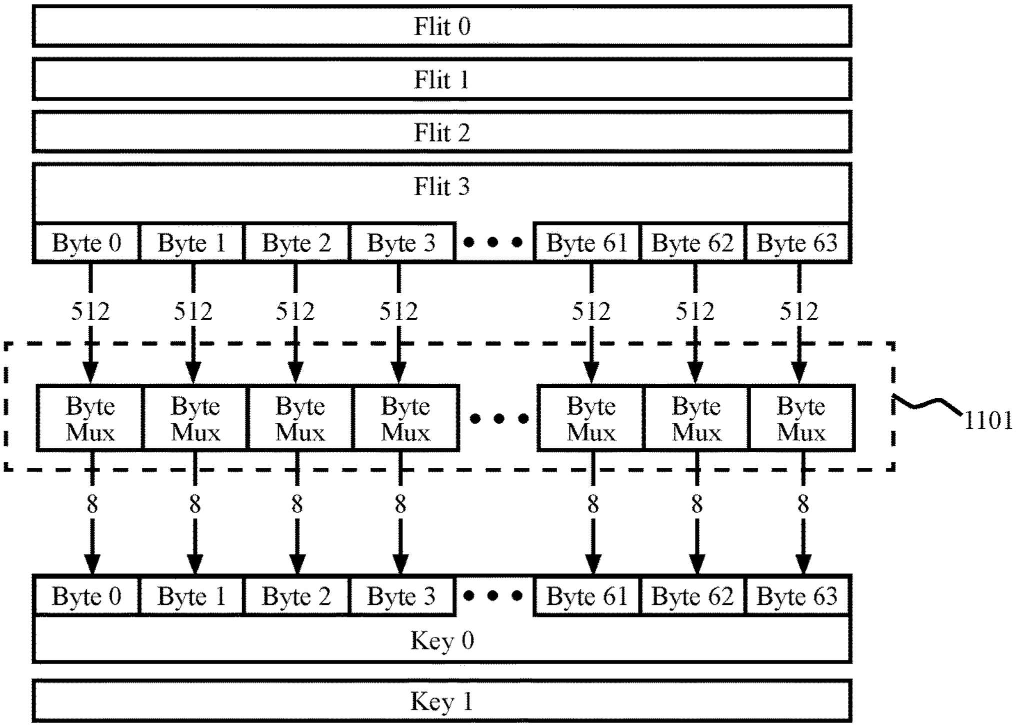
FIG. 11 illustrates using byte multiplexers to write eight-bit blocks from a PHV flit into a key according to some aspects.

FIG. 11 illustrates using byte multiplexers to write eight bit blocks from a PHV flit into a key according to some aspects. In the illustrated example, the PHV arrives in four flits that are each 64 bytes long. 64 bytes is 512 bits. The PHV is 256 bytes long. 256 bytes is 2048 bits. The keys being generated are 64 bytes long. Note that other examples or implementations can have PHVs, flits, and keys of other lengths and that the key length can be less than, equal to, or greater than the flit length. There is a byte multiplexer for every byte in the key. The keys in the example have 64 bytes, as such there are 64 of the byte multiplexers. Each byte multiplexer can write into only one of the bytes of the key. For example, the 0th byte multiplexer can only write into the 0th byte of the key. In general, the nth byte multiplexer can only write into the nth byte of the key. Each byte multiplexer receives all 64 bytes (equaling 512 bits) of a flit and may write one of those bytes into the key. A byte select specification, such as byte select specification 1010 specifies a flit and specific bytes in the flit as well as the key and position in the key into which those specific bytes are to be copied. As such, byte select specification 1010 may be treated as an instruction for configuring the byte multiplexers for a byte copy operation that copies bytes from a flit into a key. Certain byte multiplexers will be configured to do nothing during a specific byte copy operation. For example, consider a byte select specification that has Flit ID=2, Byte Offset=7, Length=5, KeyID=0, Key Offset=0. Given such a byte select specification, the byte multiplexers can be configured for a byte copy operation that copies bytes 7-11 of flit 2 into bytes 0-4 of key 0. Bytes 5-63 of key 0 are not altered by this byte copy operation. The key construction circuit can include a circuit such as the circuit illustrated in FIG. 11 and use it for copying bytes from the flits into a key.

Figure 12:
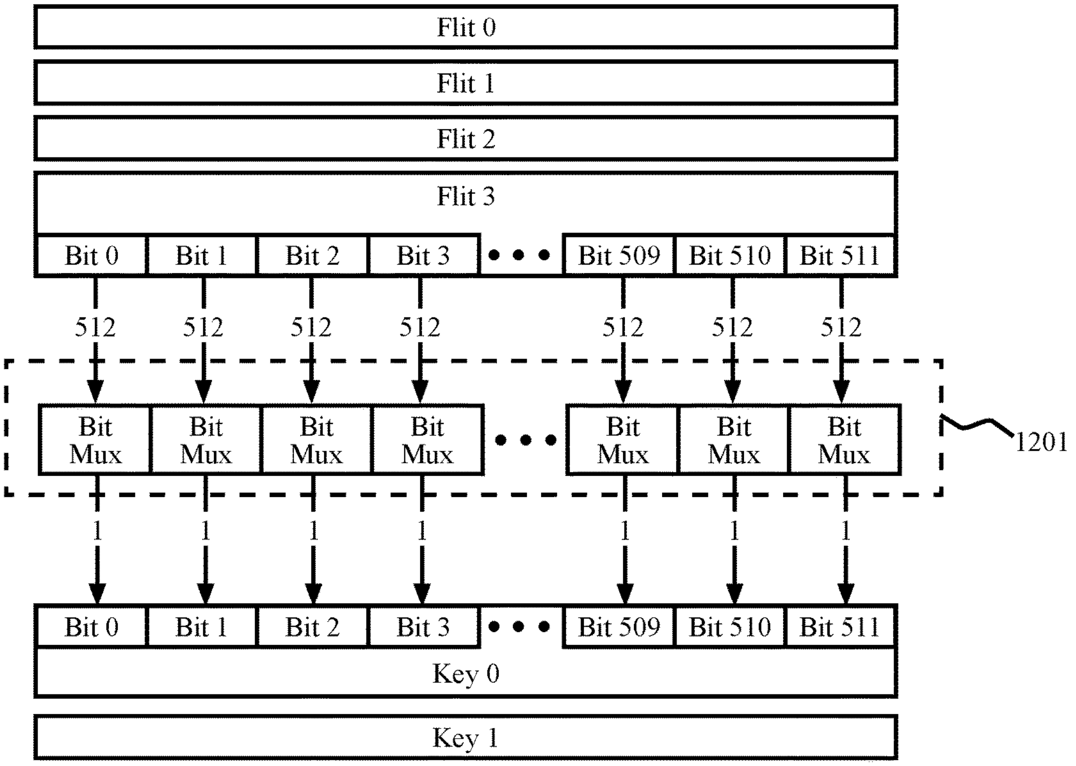
FIG. 12 illustrates using bit multiplexers to write single bits from a PHV flit into a key according to some aspects.

FIG. 12 illustrates using bit multiplexers to write single bits from a PHV flit into a key according to some aspects. In the illustrated example, the packet header arrives in four flits that are each 64 bytes long. 64 bytes is 512 bits. The PHV is 256 bytes long. 256 bytes is 2048 bits. The keys being generated are 64 bytes long. Note that other examples or implementations can have PHVs, flits, and keys of other lengths and that the key length can be less than, equal to, or greater than the flit length. There is a bit multiplexer for every bit in the key. The keys in the example have 512 bits, as such there are 512 of the bit multiplexers. Each bit multiplexer can write into only one of the bits of the key. For example, the 0th bit multiplexer can only write into the 0th bit of the key. In general, the nth bit multiplexer can only write into the nth bit of the key. Each bit multiplexer receives all 512 bits of a flit and may write one of those bits into the key. A bit select specification, such as bit select specification 1020 specifies a flit and specific bits in the flit as well as the key and position in the key into which those specific bits are to be copied. As such, bit select specification 1020 may be treated as an instruction for configuring the bit multiplexers for a bit copy operation that copies bits from a flit into a key. Certain bit multiplexers will be configured to do nothing during a specific bit copy operation. For example, consider the bit selection specification Flit ID=2, Bit Offset=67, Length=4, KeyID=0, Key Offset=100. Given such a bit selection specification, the bit multiplexers can be configured for a bit copy operation that copies bit 67-70 of flit 2 into bit 100-103 of key 0. Bits 0-99 and bits 104-511 of key 0 are not altered by this bit copy operation. The key construction circuit can include a circuit such as the circuit illustrated in FIG. 12 and use it for copying bits from the flits into a key.

A key specification can include numerous byte select specifications and numerous bit select specifications. Each byte select specification specifies a byte copy operation and each bit select specification specifies a bit copy operation. The copy operations can be performed in the order in which they appear in the key specification. As such, most of the key may be generated by byte copy operations and later occurring bit copy operations may overwrite portions of earlier copied-in bytes. The fact that a copy operation can be overwritten by a subsequent copy operation indicates that the order of copy operations is important and that the copy operations should be performed in the order in which the byte/bit select specifications occur in the key specification.

Figure 13:
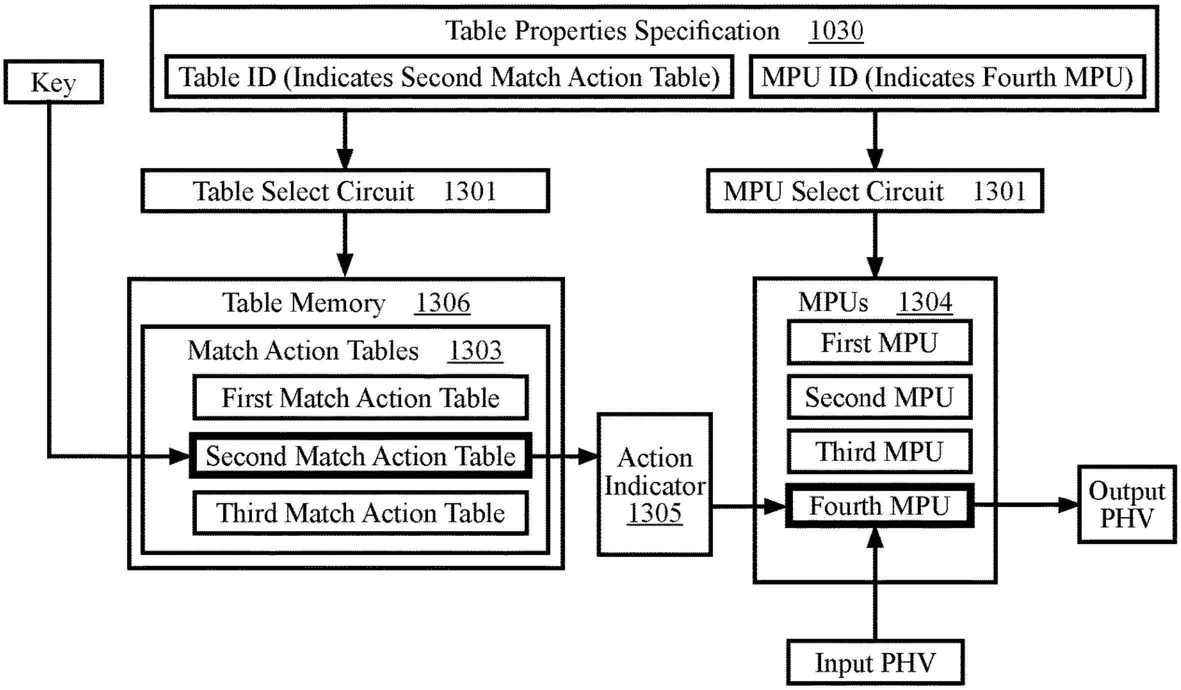
FIG. 13 illustrates using table properties specification to select a match-action table and an MPU according to some aspects.

FIG. 13 illustrates using a table properties specification 1030 to select a match-action table and an MPU according to some aspects. Match-action tables 1303 such as a first match-action table, a second match-action table, and a third match-action table can be stored in a table memory 1306. Furthermore, a processing stage can include multiple MPUs 1304 such as a first MPU, a second MPU, a third MPU, and a fourth MPU. A key specification can include a table properties specification 1030. The key specification can be used to generate a key that can be used to obtain a value from a key-value table. The table properties specification 1030 can include a table identifier and a MPU identifier. The key can be used to obtain a value from the table indicated by the table identifier. That value can be passed to the MPU identified by the MPU identifier. The value passed to the MPU indicated by the MPU identifier can be an action indicator 1305 that indicates an action to be taken by the MPU. The action indicator 1305 may be the address of executable code that the MPU is to execute. As such, the action indicator may be loaded into the MPUs program counter such that the MPU executes the code. Alternatively, the table properties may include an action address 1033 that indicates the address of executable code that the MPU is to execute with the action indicator 1305 being an input value. As such, the action indicator may be loaded into an MPU register and the action address may be loaded into the MPUs program counter such that the MPU executes the code and the code uses the action indicator.

Figure 14:
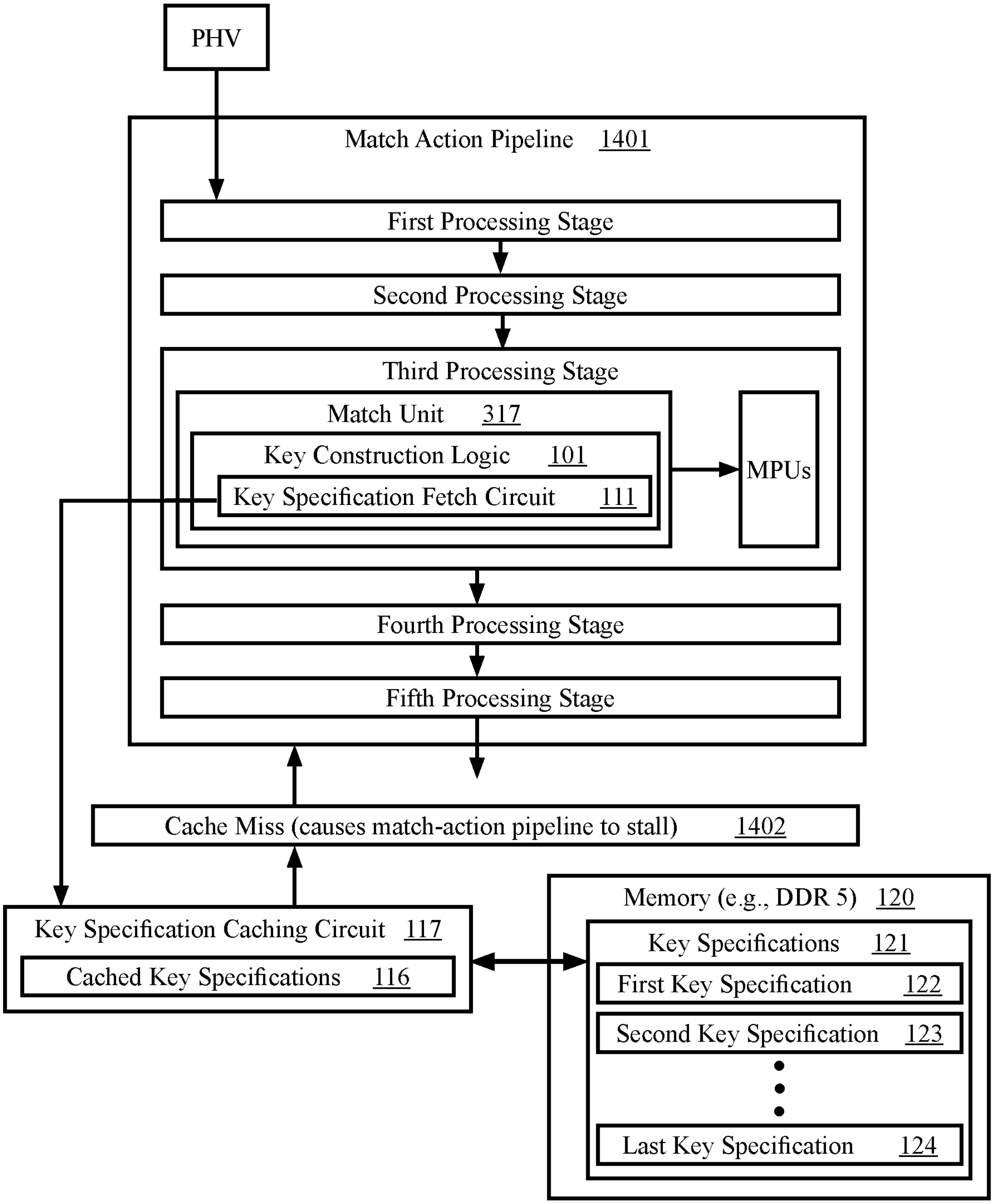
FIG. 14 illustrates a cache miss causing a packet processing pipeline circuit to stall according to some aspects.

FIG. 14 illustrates a cache miss causing a match-action pipeline 1401 to stall according to some aspects. The match-action pipeline 1401 can receive a PHV. The PHV can include an application identifier (e.g., an application identifier generated by a predicate circuit). The first processing stage of the match-action pipeline may use key generation logic to identify a first key specification and fetch the first key specification from a key specification caching circuit 117. The key specification caching circuit is caching numerous cached key specifications 116, including the first key specification. The first processing stage may then process the PHV. The second processing stage can receive the PHV from the first processing stage, obtain the first key specification from the cached key specifications, and process the PHV. The third stage can receive the PHV from the second processing stage and fetch a second key specification. Here, the second processing stage may have changed the application identifier such that the second key specification is fetched instead of the first key specification. Alternatively, a certain application identifier may result in the first and second processing stages selecting the first key specification and the third processing stage selecting the second key specification. A cache miss 1402 can occur when the third processing stage fetches the second key specification because the key specification caching circuit 117 is not caching the second key specification.

The cache miss 1402 can be reported to the match-action pipeline 1401 and can stall the entire match-action pipeline 1401. The cache miss causes the pipeline to stall because the third processing stage cannot finish processing the PHV until it receives the second key specification. The entire pipeline can stall when one of the processing stages is stalled or delayed, such as when the processing stage is waiting for a key specification. The second key specification can be fetched from the key specifications 121 stored in memory 120. In many implementations, the key specification caching circuit can fetch a key specification from memory, cache the key specification as a cached key specification 116, and pass the key specification to the processing stage that requested it. Even so, the entire pipeline is stalled until the third processing stage receives the key specification it is waiting for such that it can process the PHV.

Figure 15:
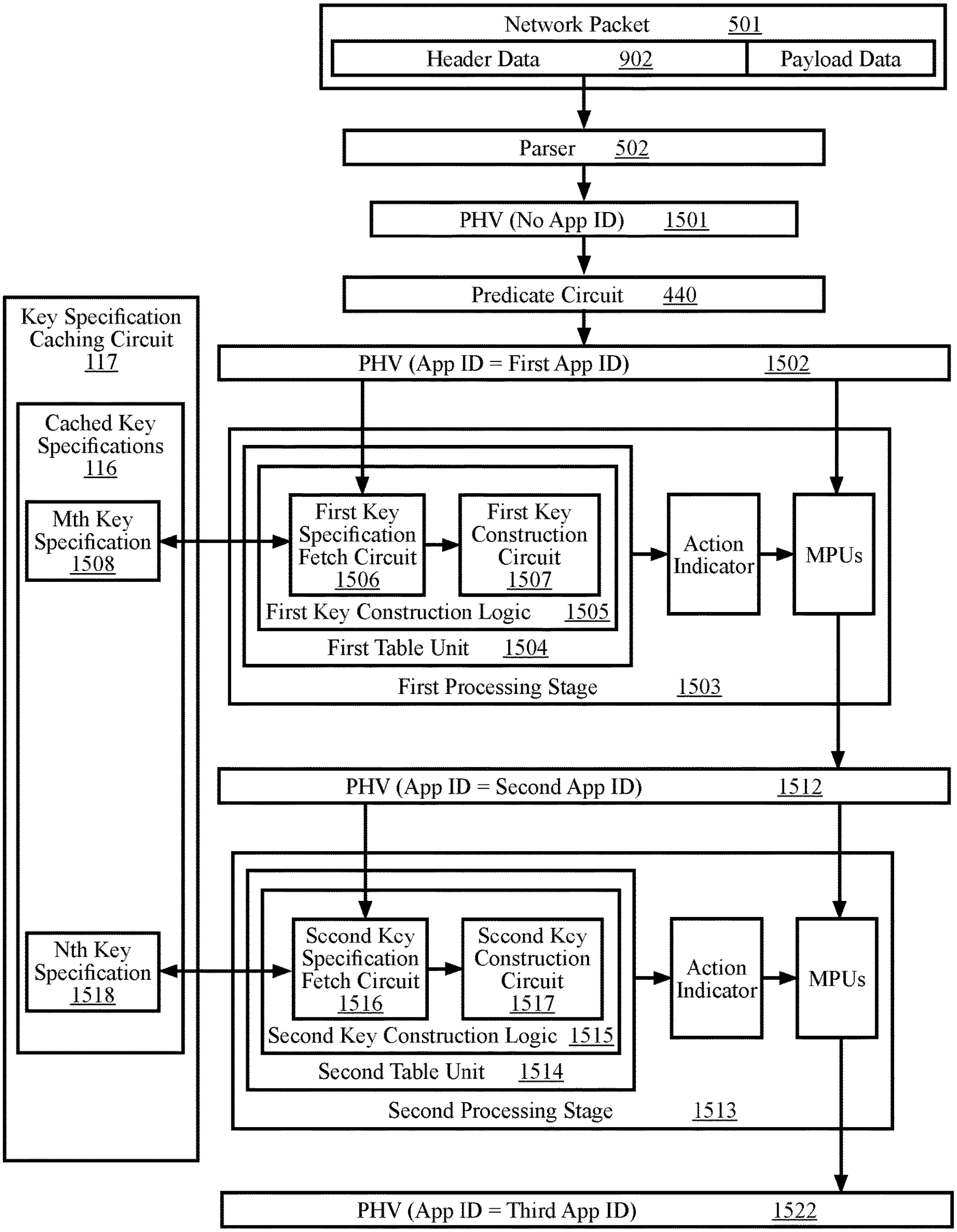
FIG. 15 illustrates the first processing stage of a match-action pipeline changing the application identifier of a PHV that is then processed by the second processing stage of the match-action pipeline according to some aspects.

FIG. 15 illustrates the first processing stage of a match-action pipeline changing the application identifier of a PHV that is then processed by the second processing stage of the match-action pipeline according to some aspects. A network packet 501 that includes header data 902 is received. A parser 502 parses the header data 902 and produces a PHV 1501 that does not yet include an application identifier. A predicate circuit 440 uses data in the PHV to generate a first application identifier and incorporates the first application identifier in the PHV 1502. The first processing stage 1503 receives the PHV 1502. The first processing stage 1503 includes a first table unit 1504 and some MPUs. The first table unit 1504 includes a first key construction logic 1505 that in turn includes a first key specification fetch circuit 1506 and first key construction circuit 1507. The first key construction logic uses the first application identifier to identify the Mth key specification 1508. The first key specification fetch circuit 1506 fetches the Mth key specification 1508 from the key specification caching circuit 117. The first key construction circuit 1507 uses the Mth key specification to generate a key that is used to obtain an action indicator from a match-action table. The MPUs can process the PHV based on or using the action indicator.

When processing a PHV, the MPUs can add new data in new PHV fields, delete existing PHV fields, and can change the data in existing PHV fields. The first application identifier is the data in the application identifier field of the PHV 1502 received by the first processing stage. The code that the MPU uses to process the PHV can write a second application identifier value into the application identifier field of the PHV. As such, the PHV 1512 has an application identifier equaling the second application identifier.

The second processing stage 1513 receives the PHV 1512. The second processing stage 1513 includes a second table unit 1514 and some MPUs. The second table unit 1514 includes a second key construction logic 1515 that in turn includes a second key specification fetch circuit 1516 and second key construction circuit 1517. The second construction logic uses the second application identifier to identify the Nth key specification 1518. The second key specification fetch circuit 1516 fetches the Nth key specification 1518 from the key specification caching circuit 117. The second key construction circuit 1517 uses the Nth key specification to generate a key that is used to obtain an action indicator from a match-action table. The MPUs can process the PHV based on or using the action indicator.

Figure 16:
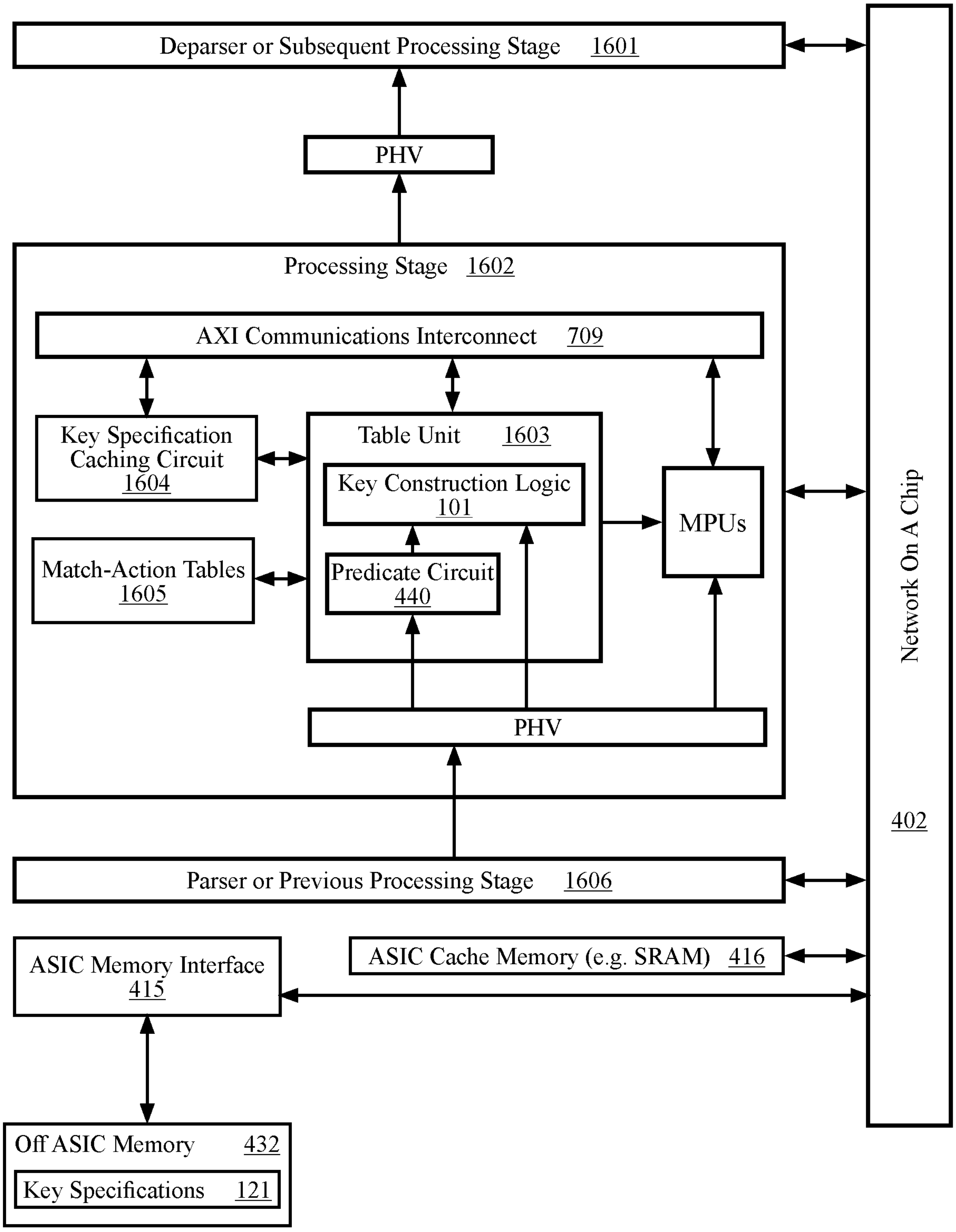
FIG. 16 is a high-level block diagram illustrating a processing stage that includes a predicate circuit and a key specification caching circuit according to some aspects.

FIG. 16 is a high-level block diagram illustrating a processing stage 1602 that includes a predicate circuit 440 and a key specification caching circuit 1604 according to some aspects. Implementations of the aspects may incorporate a predicate circuit and a key specification caching circuit in one, many, or all of the processing stages of a packet processing pipeline circuit. The processing stage 1602 can receive a PHV from a parser circuit or previous processing stage 1606. The processing stage 1602 can have a table unit 1603 that includes a predicate circuit 440 that uses the PHV to produce an application identifier that is passed to the key construction logic 101. The key construction logic 101 can attempt to fetch the key specification associated with the application identifier from a key specification caching circuit 1604 that is included in the processing stage 1602. Alternatively, the key specifications may be cached in a partition of a pipeline memory circuit (e.g., pipeline memory circuit 702 illustrated in FIG. 7) that is assigned to the processing stage 1602. A cache miss at the key specification caching circuit may result in reading the key specification from the key specifications 121 stored in the off ASIC memory 432. The key specification may be cached in the ASIC cache memory 416 such that the ASIC cache memory 416 returns the key specification to the key specification caching circuit 1604. Otherwise, the key specification may be read from the off ASIC memory 432 via the ASIC memory interface 415. The key construction logic 101 can use the PHV and the key specification to produce a key. The table unit 1603 can obtain an action indicator from one of the match-action tables 1605 that may also be stored in the processing stage or in the partition of pipeline memory. As discussed above, the key specification may specify the one of the match-action tables from which to obtain the action indicator. The MPUs can use the action indicator to process the PHV. After processing the PHV, the processing stage 1602 can send the PHV to a deparser or the next processing stage 1601.

Figure 17:
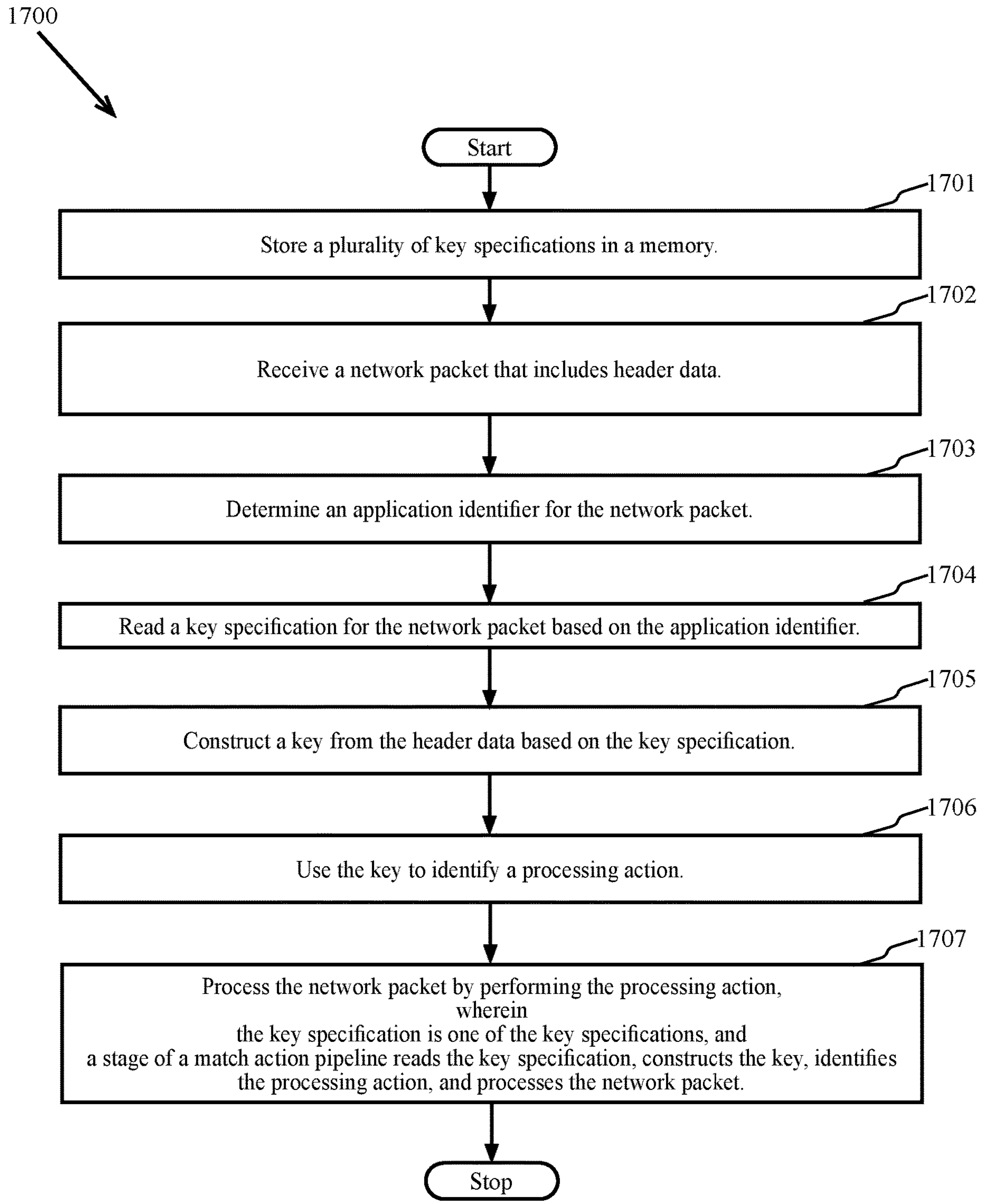
FIG. 17 is a high-level flow diagram illustrating a method for selecting a key specification for constructing a key for a packet header vector key based on an application identifier according to some aspects.

FIG. 17 is a high-level flow diagram illustrating a method for selecting a key specification for constructing a key for a packet header vector key based on an application identifier 1700 according to some aspects. At block 1701, the method can store a plurality of key specifications in a memory. At block 1702, the method can receive a network packet that includes header data. At block 1703, the method can determine an application identifier for the network packet. At block 1704, the method can read a key specification for the network packet based on the application identifier. At block 1705, the method can construct a key from the header data based on the key specification. At block 1706, the method can use the key to identify a processing action. At block 1707, the method can process the network packet by performing the processing action, wherein the key specification is one of the key specifications, and a processing stage of a match-action pipeline reads the key specification, constructs the key, identifies the processing action, and processes the network packet.

Aspects described above can be ultimately implemented in a network appliance that includes physical circuits that implement digital data processing, storage, and communications. The network appliance can include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A network appliance comprising:
- a memory that is configured to store a plurality of key specifications;
- a match-action pipeline circuit that includes a processing stage circuit;
- a key specification fetch circuit that is in the processing stage circuit; and
- a key construction circuit that is in the processing stage circuit, wherein
- the network appliance receives a network packet that includes header data,
- the network appliance determines an application identifier for the network packet,
- the key specification fetch circuit uses the application identifier to read a key specification that is one of the key specifications,
- the key construction circuit uses the key specification to construct a key from the header data,
- the processing stage circuit uses the key to obtain an action indicator from a key-value table, and
- the processing stage circuit processes the network packet based on the action indicator.

2. The network appliance of claim 1, wherein a predicate circuit produces the application identifier.

3. The network appliance of claim 1 further including a key specification caching circuit that is configured to cache a subset of the key specifications.

4. The network appliance of claim 3, wherein:
- the key specification is cached in the key specification caching circuit; and
- the key specification caching circuit provides the key specification to the key construction circuit.

5. The network appliance of claim 3, wherein:
- a cache miss indicates that the key specification is not cached in the key specification caching circuit, and
- the key specification is read from the memory and cached in the key specification caching circuit.

6. The network appliance of claim 5 wherein the cache miss causes the match-action pipeline circuit to stall.

7. The network appliance of claim 1, wherein:
- the match-action pipeline circuit includes a second processing stage circuit;
- the second processing stage circuit includes a second key specification fetch circuit and a second key construction circuit;
- the processing stage circuit produces a second application identifier;
- the second key specification fetch circuit uses the second application identifier to read a second key specification;
- the second key specification is one of the key specifications;
- the second key construction circuit uses the second key specification to construct a second key; and
- the second processing stage circuit processes the network packet based on the second key.

8. The network appliance of claim 1, wherein:

the key specification includes a byte select field that indicates a byte in the header data and a location in the key; and the key construction circuit copies the byte in the header data to the location in the key.

9. The network appliance of claim 1, wherein:

the key specification includes a bit select field that indicates a bit in the header data and a location in the key; and the key construction circuit copies the bit in the header data to the location in the key.

10. The network appliance of claim 1, further including:

a table memory that stores a plurality of match-action tables; and a table unit that is in the processing stage circuit, wherein the key specification includes a table properties specification that includes a table indicator, the table indicator indicates a match-action table that is one of the match-action tables, and the table unit uses the key and the table indicator to obtain the action indicator from the match-action table.

11. The network appliance of claim 1, further including:

a table unit that is in the processing stage circuit; and a plurality of match processing units that are in the processing stage circuit, wherein the table unit uses the key to obtain the action indicator, the key specification includes a processing unit selection indicator, the processing unit selection indicator is used to select one of the match processing units, and the one of the match processing units performs an action that is indicated by the action indicator.

12. The network appliance of claim 1, wherein:

the header data includes an ethertype value in an ethertype field; and the application identifier is based on the ethertype value.

13. A method comprising:

storing a plurality of key specifications in a memory;

receiving a network packet that includes header data;

determining an application identifier for the network packet;

reading a key specification for the network packet based on the application identifier;

constructing a key from the header data based on the key specification;

using the key to identify a processing action; and processing the network packet by performing the processing action, wherein the key specification is one of the key specifications, and a processing stage circuit of a match-action pipeline circuit reads the key specification, constructs the key, identifies the processing action, and processes the network packet.

14. The method of claim 13, wherein a predicate circuit uses the header data to determine the application identifier.

15. The method of claim 13, further including caching a subset of the key specifications in a key specification caching circuit.

16. The method of claim 15, wherein:

a cache miss indicates that the key specification is not cached in the key specification caching circuit, the key specification is read from the memory and cached in the key specification caching circuit, and the cache miss causes the match-action pipeline circuit to stall.

17. The method of claim 13, wherein:

the key specification includes a byte select field that indicates a byte in the header data and a location in the key; and a key construction circuit copies the byte in the header data to the location in the key.

18. The method of claim 13, further including:

storing a plurality of match-action tables a table memory, wherein the key specification includes a table properties specification that includes a table indicator, the table indicator indicates a match-action table that is one of the match-action tables, and the processing stage circuit includes a table unit that uses the key and the table indicator to obtain an action indicator from the match-action table.

19. A system comprising:

a memory configured to store a plurality of key specifications that includes a key specification for a network packet that includes header data;

an identification means for determining an application identifier for the network packet;

a key specification fetch means for reading the key specification for the network packet, the key specification fetch means using the application identifier to read the key specification;

a key construction means for constructing a key from the header data based on the key specification; and a processing means for processing the network packet by performing a processing action in response to using the key to identify the processing action.

20. The system of claim 19, further including:

a means for specifying a plurality of header data bits;

a means for specifying a location in the key; and a means for copying the plurality of header data bits to the location in the key.

* * * * *